Figure 5:
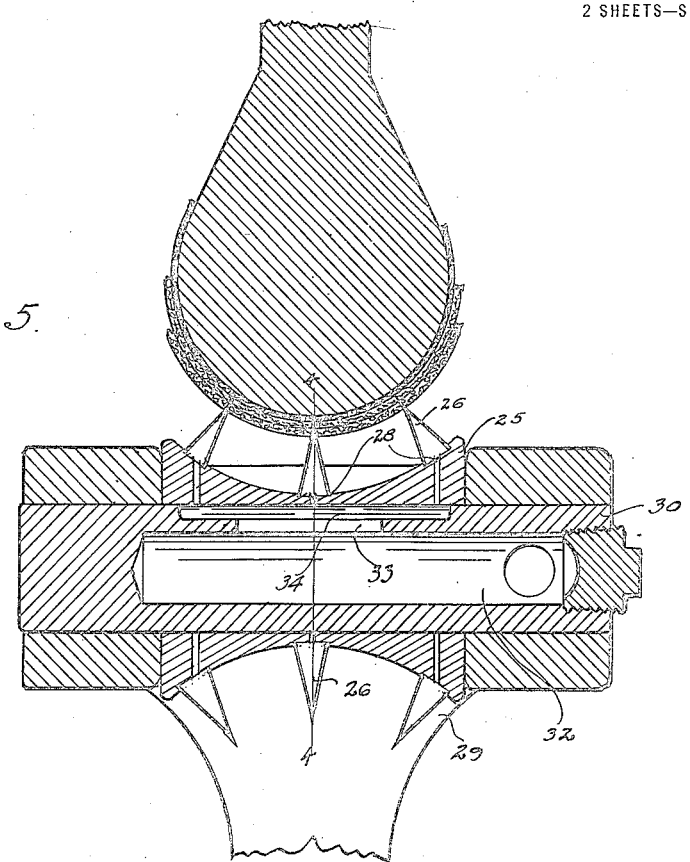

F. T. ROBERTS.
METHOD OF AND APPARATUS FOR PREVENTING AIR BUBBLES IN LAMINATED RUBBER ARTICLES.
APPLICATION FILED SEPT. 13, 1920.
1,433,971.
Patented Oct. 31, 1922.
2 SHEETS—SHEET 1.
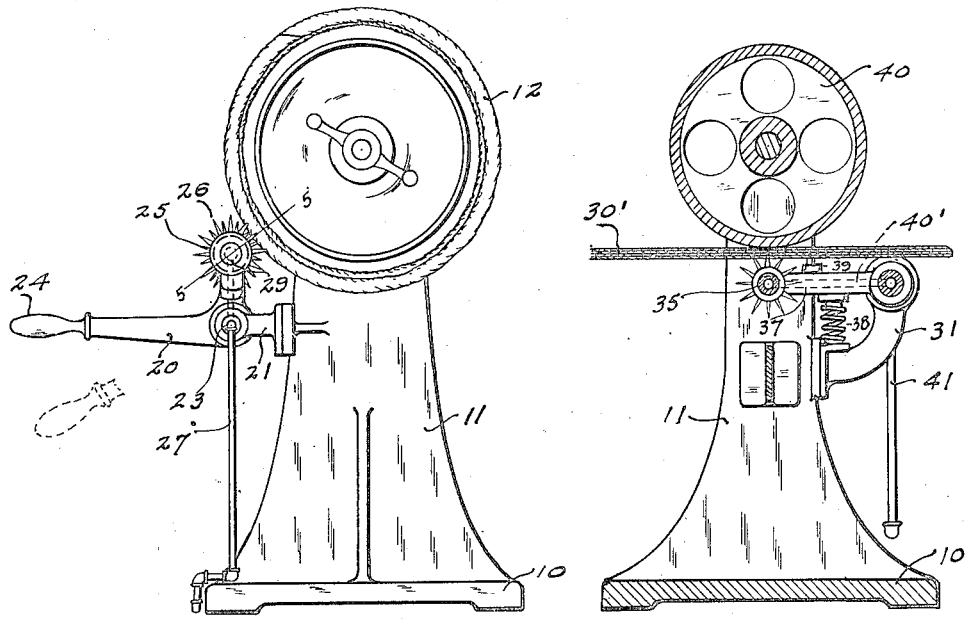
FIG.-1.
FIG.-2.
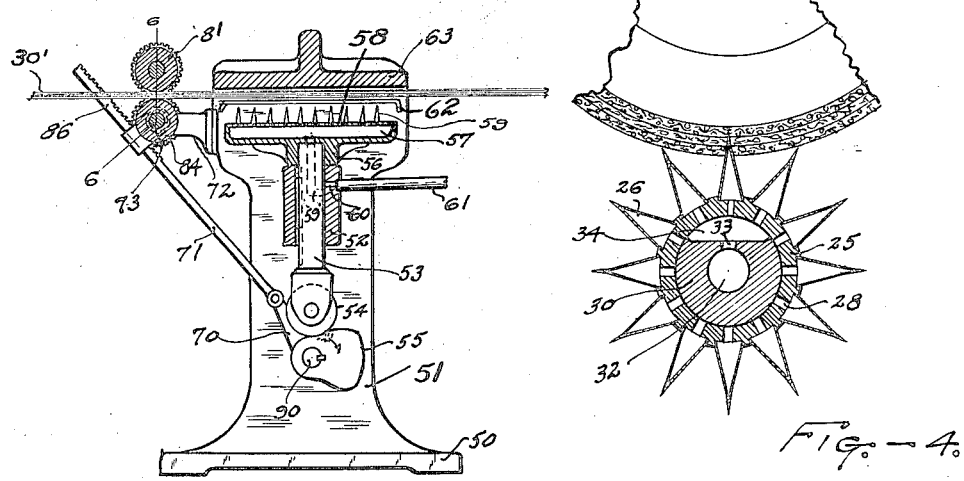
FIG.-3.
FIG.-4.
INVENTOR
Fred Thomas Roberts
BY Bates & Macklin
ATTORNEYS Patented Oct. 31, 1922.

1,433,971

UNITED STATES PATENT OFFICE.

FRED THOMAS ROBERTS, OF CLEVELAND, OHIO.

METHOD OF AND APPARATUS FOR PREVENTING AIR BUBBLES IN LAMINATED RUBBER ARTICLES.

Application filed September 13, 1920. Serial No. 409,847.

*To all whom it may concern:*

Be it known that I, FRED THOMAS ROBERTS, a citizen of the United States, residing at Cleveland, in the county of Cuyahoga and State of Ohio, have invented a certain new and useful Improvement in Methods of and Apparatus for Preventing Air Bubbles in Laminated Rubber Articles, of which the following is a full, clear, and exact description, reference being had to the accompanying drawings.

The general object of this invention is to provide a simple and efficient method and apparatus for preventing air bubbles in laminated articles.

In making a rubber tire or belt, for example, one of the first steps is to place the various layers which go to make up the finished product one upon the other. In doing this a small amount of air is entrapped between the individual sheets and these air pockets if allowed to remain in the finished article are quite objectionable.

One of the objects of my invention is to provide a method whereby the air pockets formed between sheets in the manner described or in any other manner may be removed.

A further object of the invention is to provide a suitable apparatus for the removal of air pockets in laminated material.

A specific object of the invention is to provide a suitable method and apparatus whereby a hollow needle may be inserted between the laminations of a compound article and the entrapped air between such laminations removed by suction.

The invention is illustrated in the drawings, and is later described in the claims.

Figure 6:
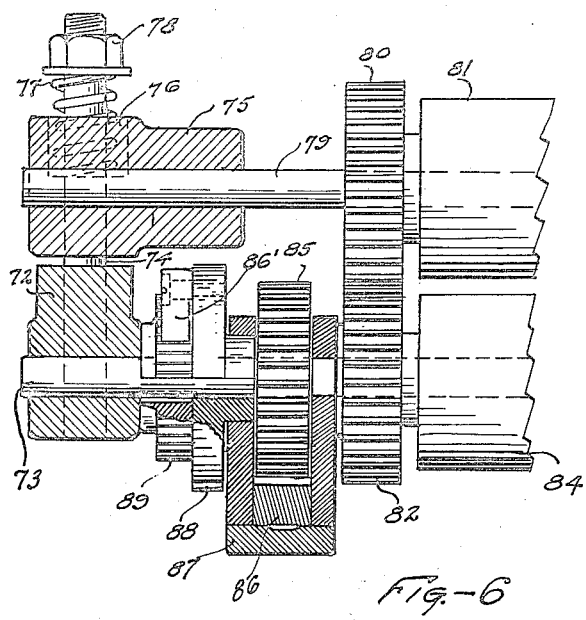
Figure 7:
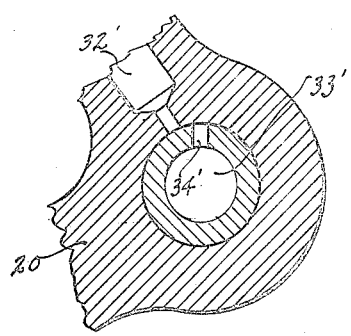

In the drawings, Fig. 1 is a side elevation of a machine showing a form of my invention as used for removing air from between the layers of a tire; Fig. 2 is a cross-sectional view of a machine for removing air from a laminated sheet; Fig. 3 is a cross-section of a modified form of machine for removing air from between the layers of a sheet; Fig. 4 is a cross-section of the hub and hollow needles taken on line 4—4, Fig. 5; Fig. 5 is a section on the line 5—5, Fig. 1; Fig. 6 is a transverse section taken on the line 6—6 in Fig. 3, and Fig. 7 is a fragmentary sectional view on an enlarged scale of the bell crank lever used in the machine shown in Fig. 1.

In Fig. 1, I have shown at 10, a base member having thereon a pedestal 11. Mounted upon a suitable support adjacent the upper end of the pedestal is a tire 12. The tire is adapted to be rotated in a suitable manner by means of any desired mechanism, not shown, but which is well known in the art.

A bell crank lever 20 is shown as mounted on a bracket 21, carried by the pedestal 11. The lever 20 is adapted for pivotal movement about the center 23 and is provided at one end with an operating handle 24, and at the other end supports in a yoke 29 an annular hub 25, the latter being shaped to correspond with the transverse contour of the tire and being provided in its periphery with a series of hollow needles 26. The needles 26, as shown in Fig. 5, are mounted in the hub 25, the latter having apertures 28 communicating with each hollow needle. The hub 25 may rotate about a bearing 30 having a hollow portion 32, from which a channel 33 extends to a port 34. From the construction shown it will be apparent that as the hub 25 rotates, the needles will be placed consecutively in communication with the passage 32 in the bearing member. This passage 32 leads to a channel 32' shown as located in the bell crank 20 and may be connected to a pipe 27 leading off from the chamber 33', the pipe 27 being connected with suitable source of vacuum. In order to cut off the vacuum when the needles are in inoperative position, I provide a valve device shown in Fig. 7 wherein the handle 20 in raised position allows communication between chambers 32' and 33' through the channels 34'; but closes communication, as shown, when the handle is depressed.

The tire being positioned and suitably rotated, the handle 24 is lifted to the full line position, forcing the hollow needles 26 into the tire. The arrangement of the port 34 with respect to the tire or other object being operated upon is such that only the needles which are embedded in the object are in communication with the source of vacuum. As the tire rotates, the needle carrying member rolls upon its outer surface, piercing the tire and at the same time withdrawing any air which may be present between the layers of the material constituting the tire. After the tire has made one or more complete revolutions and the air has been withdrawn from between the layers, the handle is depressed thereby withdrawing the needles.

In Fig. 2, I have shown a device which is adapted to be used for removing air pockets from a laminated flat sheet such as, for example, a belt. The belt, as usual, may comprise a series of laminations 30' laid upon one another and having pockets of entrapped air. As in the previous form, a base 10 and pedestal 11 may be provided, the latter being shown as having a bracket 31 thereon. Pivotally carried by an arm 37 mounted on the bracket 31 is a rotatable wheel 35 corresponding to the rotatable wheel shown in Fig. 4. This wheel used in this form of invention differs, however, from that shown in Fig. 1, in that the radius of all the needles is of an equal length, whereas in the previous form, the needles are made of various lengths to fit the contour of the tire. The arm 37 is urged upwardly by a spring 38, a suitable stop 39 limiting the upward movement. Mounted above the wheel 35 is a suitable roller 40 which may be suitably driven and with which the belt 30 contacts. The wheel 35 as in previous form is placed in communication through a suitable passage 40' and pipe 41 with a source of vacuum.

In operation the laminated sheet is led between the roller 40 and the needle bearing wheel 35. The spring 38 pushing upwardly on the arm 37 causes the needles adjacent the belt to pierce it. These needles being in communication, in this position, with the source of vacuum withdraws the air from between the laminations, thereby assuring a perfect joint between the layers.

Referring to the embodiment shown in Fig. 3, 50 indicates a base member having a pedestal 51 thereon. Shown as secured to the pedestal is a member 52, which is apertured to receive a reciprocating stem 53, carrying at its lower end, a roller 54 adapted to contact with a cam 55. Mounted upon the upper end of the stem 53 is a platen 56 shown as having hollow portion 57 and as provided in its upper face 58 with hollow needles 59, the latter being in communication with the hollow portion 57. The upper portion of the stem 53 is likewise hollow and communicates with the hollow portion of the platen 56.

A passageway 59' affords communication between the hollow portions and a channel 60 in the member 52. The channel 60 may be connected through a pipe 61 with a source of vacuum. Suitably mounted above the teeth 59 is a stripper 62 for purposes to be presently described. An upper plate 63 is shown as suitably supported upon the pedestal, the lower face of the plate 63 being substantially parallel to the plane of upper extremities of the hollow needles 59.

Pivotally mounted co-axial with the cam 55 is a crank 70 connected to a rod 71 adapted for reciprocating movement. A suitable bracket 72 secured to the pedestal furnishes a bearing for an axle 73. Mounted upon brackets 72 (see Fig. 6) are rods 74, and loosely carried upon the rods 74 for vertical movement are second bearing members 75. The latter may be recessed at 76 for the reception of suitable coil springs 77. These coil springs may be secured in place by a nut 78 threaded upon the rod 74. The block 75 provides a bearing for an axle 79, carrying a gear wheel 80 and a suitable roller 81.

The axle 73 has keyed thereon a gear wheel 82 which meshes with the gear wheel 80 keyed on axle 79. A second roller adapted to co-operate with the roller 81 being shown as mounted on the axle 73 at 84. Loosely mounted on the shaft 73 is a pinion 85, the teeth of the latter engaging the teeth of a rack 86. The rack is suitably supported in a stirrup 87 mounted upon the axle 73. The pinion 85 is shown as suitably connected to rotate with a member 88, the latter carrying in a suitable manner a pawl 86, which is constructed for engagement with a ratchet 89 keyed on the shaft 73.

In the operation of the device last described, assuming a laminated sheet 30 to be inserted between the rollers 81 and 84 as shown. The shaft 90 carrying the cam 55 and the crank 70 being rotated causes the cam 55 and cam wheel 54 to give a reciprocating movement to the platen carrying the teeth 59. In its upper position the port 59' comes opposite the channel 60, thus opening the line to the vacuum, and the hollow teeth having pierced the material 30, the air is withdrawn therefrom. At the same time the crank 70 has drawn the rack 71 downward, which is its inactive movement. Continued rotation of the shaft 90 causes the platen to be lowered while the rack moves upwardly, the rack acting through the pinion 85, and pawl and ratchet 86', 89 rotates the gear 82, thereby driving the gear 80 to cause the rollers 84 and 81 to rotate in unison and feed the strip of material to present another portion to be operated upon by the vacuum needles. A reverse movement of the rack 71 is not effective in producing movement of the laminated material and it is during this pause of the forward movement of the laminated strip that the teeth of the platen pierce it.

Having thus described my invention, I claim:

1. The method of removing air from between the laminations of the built up material as the article moves which comprises piercing the material and withdrawing the air through the piercing means.

2. The method of removing air from between the laminations of a compound fabric, which comprises inserting a hollow needle which moves with the material between said laminations and applying suction to the needle.

3. In the method of making laminated rubber articles, the step which consists of inserting into the body of the article a hypodermic needle which moves with the material and to which suction is applied.

4. The method of making laminated rubber without confined air bubbles, which comprises removing the air from the rubber as it moves by inserting a hypodermic needle between the laminations and sucking the air therethrough while the rubber is in a raw state, removing the needle and thereafter vulcanizing the article.

5. The method of making laminated articles free of air between the laminations, which comprises placing the layers one upon the other, and then removing the air between the superimposed layers, through apertures made in the layers.

6. The method of removing air from between the laminations of a compound material, which comprises thrusting a hollow needle through a plurality of laminations, the needle being in communication with a vacuum while being inserted.

7. The method of removing air from between the layers of a moving laminated sheet comprising inserting a hollow needle through a plurality of layers while they are moving, and sucking the air from between each two contiguous sheets as the needle is inserted and withdrawn.

8. An apparatus for removing air bubbles from between the layers of a moving laminated material, comprising a rotary member carrying a plurality of hollow needles adapted to project through a layer of the laminated sheets, and a source of vacuum in communication with said needles.

9. An aparatus for removing air from between the layers of laminated material comprising a resistant member, a second member rotatably mounted and carrying a plurality of needles and adapted to bear upon and pierce a laminated material resting against the resistant member, said needles being hollow and adapted to be placed in communication with a vacuum.

10. An apparatus for removing air from between the layers of laminated material comprising a movable resistant member, a second movable member carrying a plurality of needles and adapted to bear upon, and pierce, a laminated material resting upon the resistant member, said needles being hollow, and means for putting the needles in communication with a vacuum source while being inserted.

11. An apparatus for removing air bubbles from between the layers of a laminated material, comprising a roller carrying a plurality of hollow needles adapted to project between the layers of the laminated sheets, and a source of vacuum in communication with said needles.

12. In an apparatus for removing air from between the laminations of an article, a rotary member having a plurality of hollow needles communicating with the interior thereof, a hollow stem on which said member rotates, and a passageway affording communication at times between the needles and the hollow stem and in communication with a source of reduced air pressure.

13. An apparatus for removing air bubbles from between the layers of laminated material, comprising a roller carrying a plurality of hollow needles adapted to project between the layers of the laminated sheets, a source of vacuum in communication with said needles, and a rotary opposition member in co-operation with said roller.

14. An apparatus for removing air from between the layers of laminated material comprising a roller carrying a plurality of needles and adapted to bear upon and pierce a laminated material, said needles being hollow and in communication with the vacuum, and means for moving the laminated article in such manner that it has rolling contact with the needle-carrying roller.

15. In an apparatus for removing air from between the laminations of an article, a rotary member having a plurality of hollow needles projecting from the axis of the member varying amounts, a passageway adapted to afford communication between the needles and a source of reduced air pressure, and means for causing said needles to bear upon and puncture a laminated article.

16. In an apparatus for removing air from between the laminations of a tire casing comprising a rotary holder for the casing, a rotary member having a plurality of hollow needles projecting from the member in such manner that the points of the needles lie in a curve corresponding to the contour of the tire casing, a passageway adapted to afford communication between the needles and a source of reduced air pressure, and means for causing said needles to bear upon and puncture the tire casing.

17. The method of removing air from an article which comprises successively moving adjacent portions of the article, adjacent puncturing means moving in a plane different from the plane of the movement of the article and communicating with a vacuum and successively puncturing the article by said means and removing the air therefrom.

18. In an apparatus for removing air from an article, a member to support the article, a second member having a hollow needle connected with a vacuum and means for successively bringing adjacent portions of said article into operative relation with said needles, puncturing said portion and removing the air therefrom.

19. In a device of the class described, means to support an article, a head having a plurality of hollow needles in communication with a vacuum, means for feeding successive portions of an article adjacent to said needles and means to cause said needles to puncture the article and remove air therefrom.

20. In a device of the class described, a rotary head having hollow needles thereon and having a channel adapted to be connected with a vacuum and communicating with said needles.

21. In a device of the class described, a head having a channel therein and hollow projections thereon, channels in the head communicating with said first named channel and with said projections respectively, a bearing adapted to have air tight connections with said head and having a channel therein communicating with first named channel in the head.

22. In a device of the class described, a hollow head, hollow needles mounted thereon, transverse channels in said head adapted to communicate with said needles respectively, a bearing having air tight connection with said head and having a channel therein adapted to be connected with a vacuum and to communicate with said transverse channels successively as the head rotates.

23. In a device of the class described, a hollow head having transverse channels, hollow needles communicating therewith, a bearing fitted in the head and having a longitudinal slot in one side adapted to communicate with the side of the head and with the needle channels successively as the head rotates.

In testimony whereof I hereunto affix my signature.

FRED THOMAS ROBERTS.